United States Patent [19]

D'Amato et al.

[11] Patent Number: 5,071,597
[45] Date of Patent: Dec. 10, 1991

[54] PLASTIC MOLDING OF ARTICLES INCLUDING A HOLOGRAM OR OTHER MICROSTRUCTURE

[75] Inventors: Salvatore F. D'Amato, Floral Park; Donald W. Mallik, North Tarrytown, both of N.Y.

[73] Assignee: American Bank Note Holographics, Inc., Elmsford, N.Y.

[21] Appl. No.: 413,307

[22] Filed: Sep. 27, 1989

Related U.S. Application Data

[63] Continuation-in-part of Ser. No. 360,262, Jun. 2, 1989, abandoned.

[51] Int. Cl.⁵ .................... B29D 11/00; B29C 33/38; B29C 33/42
[52] U.S. Cl. .................................. 264/1.3; 264/1.4; 264/1.7; 264/2.5; 264/22; 264/219; 264/220; 264/225
[58] Field of Search ................ 264/1.3, 1.7, 2.5, 219, 264/220, 1.4, 22, 225; 425/808

[56] References Cited

U.S. PATENT DOCUMENTS 3,565,978  2/1971  Folger et al. .................. 264/1.3
4,044,939  8/1977  Horst et al. .................... 264/2.5
4,737,096  4/1988  Poorten ......................... 264/107

FOREIGN PATENT DOCUMENTS

3736119A1  5/1989  Fed. Rep. of Germany .
132271  8/1983  Japan ............................ 264/1.3
61-221392  10/1986  Japan .
62-30030  2/1987  Japan .
79489  4/1987  Japan ........................... 264/1.3
62-79489  4/1987  Japan .
62-80045  4/1987  Japan .
62-101438  5/1987  Japan .
62-119100  5/1987  Japan .
62-128720  6/1987  Japan .
62-146624  6/1987  Japan .

OTHER PUBLICATIONS

Legierse et al., "Electroformed Molds for Optical Readout Discs", *Plating and Surface Finishing*, Dec. 1984, pp. 21–25.
Baeyens, "Electroformed Molds and Dies", *Plating*, May 1966, pp. 591–597.

*Primary Examiner*—James Lowe
*Attorney, Agent, or Firm*—Majestic, Parsons, Siebert & Hsue

[57] ABSTRACT

A technique for forming a mold to replicate large numbers of plastic articles, such as by injection or blow molding, wherein the mold contains a hologram or other microstructure for transfer to an outside surface of the molded article. The mold is made by electrodepositing a metal on a model of the article to be molded. Before this deposition, the hologram or other microstructure is formed on a surface area of the model by any one of several techniques. The result is a unitary mold piece in the shape of the article and having the hologram or other microstructure integrally formed on its inside surface.

38 Claims, 4 Drawing Sheets

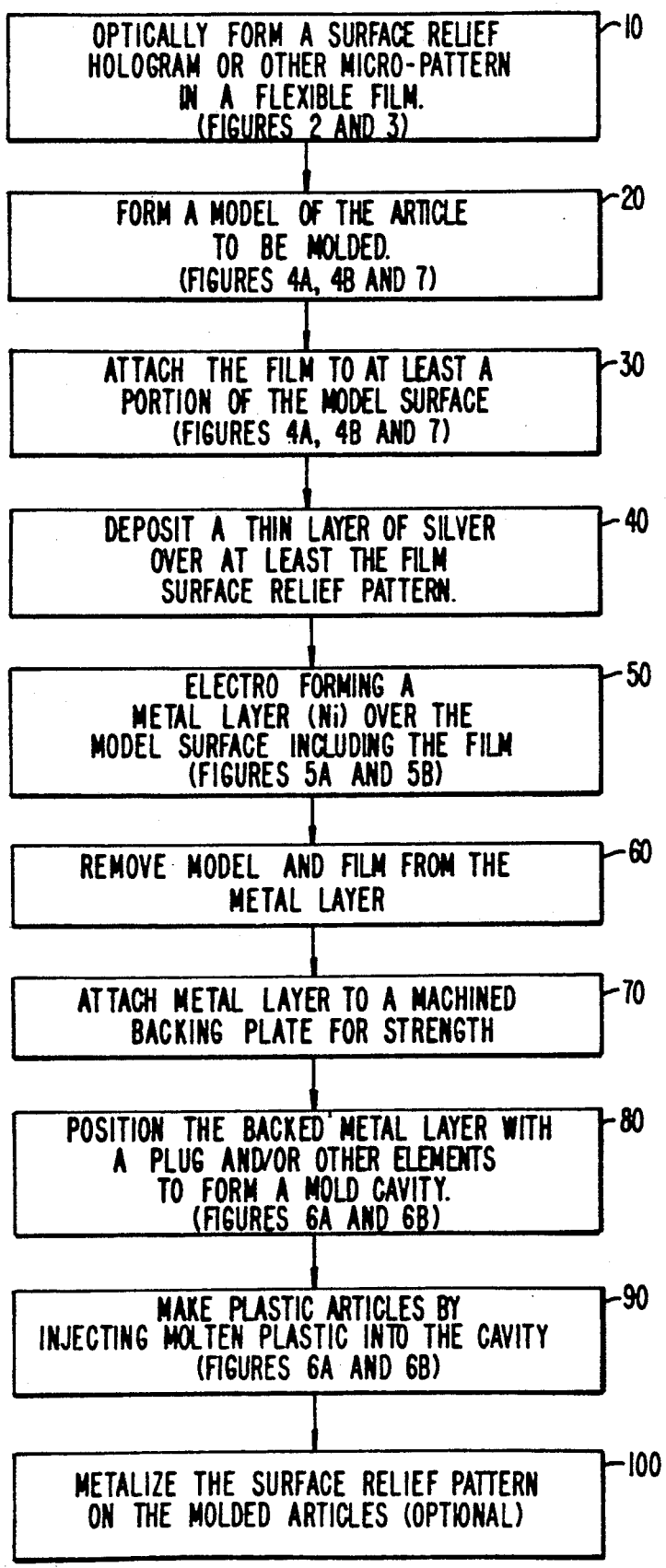
FIG._1.

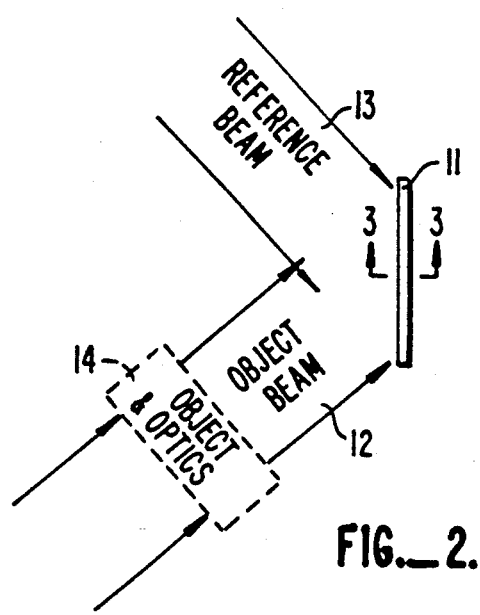
FIG._2.
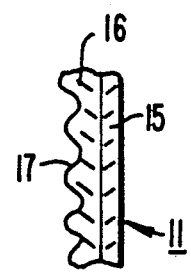
FIG._3.
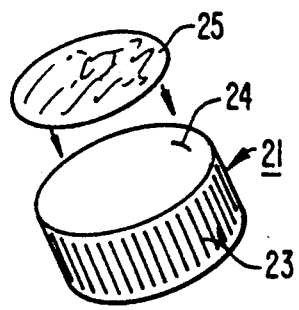
FIG._4A.
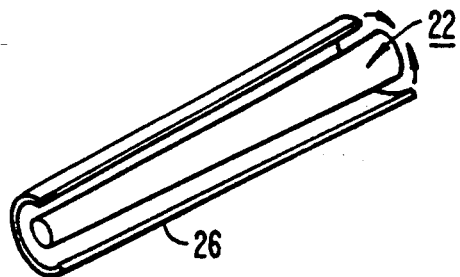
FIG._4B.
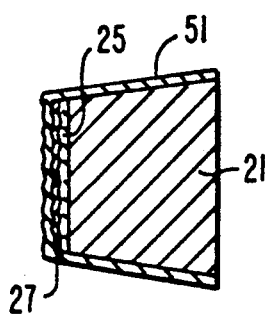
FIG._5A.
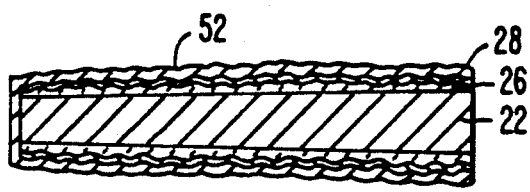
FIG._5B.

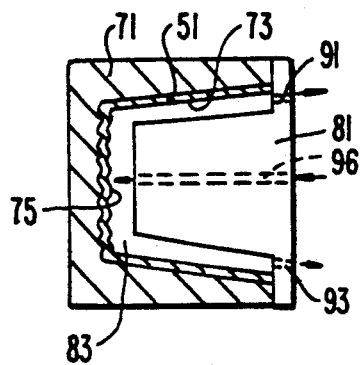
FIG._6A.
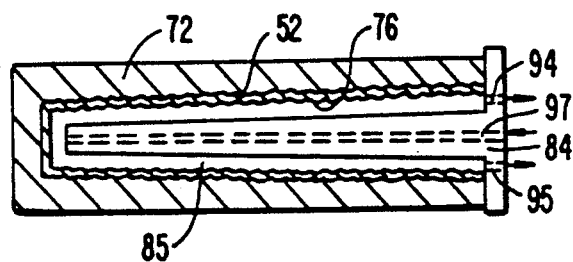
FIG._6B.
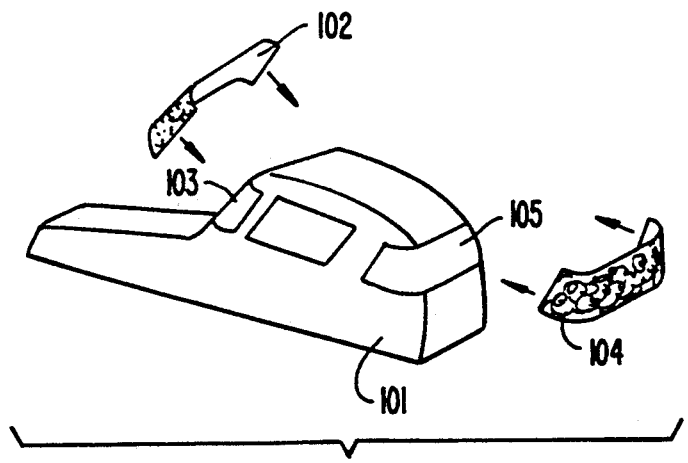
FIG._7.

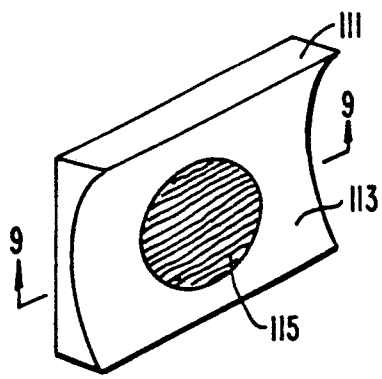
FIG._8.
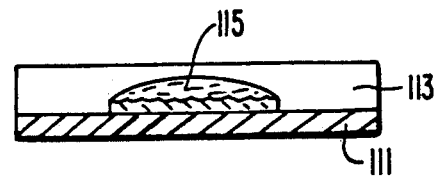
FIG._9.
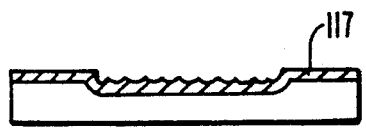
FIG._10.
FIG._11.
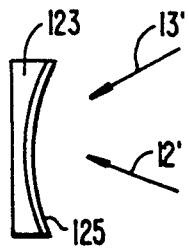
FIG._12.
FIG._13.
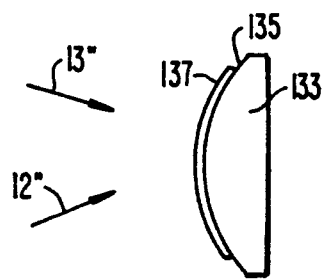
FIG._14.
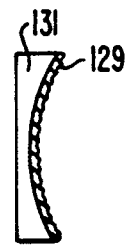
FIG._15.

PLASTIC MOLDING OF ARTICLES INCLUDING A HOLOGRAM OR OTHER MICROSTRUCTURE

CROSS-REFERENCE TO RELATED APPLICATION

This is a continuation-in-part of copending U.S. patent application Ser. No. 360,262, filed June 2, 1989 and now abandoned.

BACKGROUND OF THE INVENTION

This invention relates to the art of replicating holograms or other microstructures by plastic molding, specifically where the hologram or other microstructure is formed on a surface of a utilitarian molded part.

There are many applications where it is desirable to include a hologram or other light diffractive surface relief pattern on the outside surface of a molded plastic part. An example is a bottle cap used on a consumer goods container, such as a cosmetic container and the like, that is made by an injection molding technique. The ability for a consumer to view a holographically reconstructed image or other light pattern in light reflected from a portion of the bottle cap can form a desirable portion of the overall container appearance in order to attract customers to purchase the product.

A predominant technique for forming plastic molds is by mechanically machining them in the shape of the article to be produced. It has been suggested that an insert be positioned against an inside surface of such a mold in order to form a hologram simultaneously with forming the molded piece. The insert in such a case is a thin surface relief hologram metal master. Formation of the hologram in the surface of the molded part at the same time the molded part is formed is an improvement over the two-step procedure wherein the molded part is first made in a normal manner and then a separate hologram replica in the form of a film is subsequently attached to the molded part.

It is a primary object of the present invention to provide an improved technique for mass replicating a surface relief hologram, diffraction grating, or other microstructure.

It is a more specific object of the present invention to provide an improved method of forming a surface relief hologram, diffraction grating or other microstructure on the surface of a replicated plastic part simultaneously with that part being molded.

It is also an object of the present invention to provide improved molds that include a master surface relief hologram, diffraction grating or other microstructure, and improved articles molded therefrom.

SUMMARY OF THE INVENTION

These and additional objects are accomplished by the various aspects of the present invention wherein, briefly and generally, a mold is formed by electrodeposition onto a model of an object to be molded, or a portion of the model's surface, after the model surface has been provided with a surface relief pattern of a hologram, diffraction grating or other microstructure. The result is a mold element both in the shape of the model to be molded and including a replica of the surface relief pattern as a single integral part. The surface relief pattern is included in the mold wall just as any other surface irregularity of the model is included when the mold is formed by electrodeposition over the model. The molding operation is then accomplished in the same manner as it would be if plastic pieces of the model were being formed without the surface relief pattern. No separate piece is required to be inserted into the mold in order to mold the article with the surface relief pattern on it.

According to a first embodiment of this invention, a model of an object to be replicated by plastic molding is first formed, followed by firmly attaching a film replica of a hologram, diffraction grating or other microstructure to the surface of the model. The model will typically be of a three-dimensional object to be molded, such as the plastic bottle cap example referred to above. Often, the film will be attached to only a portion of the surface of the model. The technique allows attaching more than one piece of film to be attached to various different areas of the model, thus allowing different hologram images or light patterns to be viewed in light reflected from different portions of the model. The flexible nature of the film allows it to conform to a three-dimensional surface shape of the model.

After a model is so constructed, a mold piece conforming to the outside shape of at least a portion of the model is then formed by electrodeposition of metal over the model surface including portions occupied by one or more pieces of film and portions which have no film attached. The deposited metal is then separated from the model and mechanically reinforced for use as a mold piece for use in standard injection molding, blow molding and similar processes, wherever a molten plastic material is held against such a mold surface and allowed to harden before the plastic is removed from the mold.

According to a second embodiment of the present invention, the model with surface relief pattern is itself formed by an electrodeposition step. In this case, a female of a plastic part, such as a mold for the part, or portion of it, is made by most any known process, such as traditional machining or electrodeposition on a model of the part without any surface relief pattern on it. The same type of film discussed above, which carries the surface relief pattern to be replicated, is then attached to the female (mold) surface. That surface, with the surface relief pattern, is then replicated by an electrodeposition process. This forms a model of the object that has the surface relief pattern integrally formed as part of it. A mold is then formed from this model as discussed above.

According to a third embodiment of the present invention, the above two specific techniques are modified by forming the hologram, diffraction pattern or other microstructure directly on either the surface of a model or on a its female version such as mold for the model. By this method, the model or mold surface is coated with a photosensitive material, such as a photoresist, and then exposed to a light pattern, and processed to form the surface relief pattern. This replaces the step of attaching a film that already carries the surface relief pattern to such a model or mold surface. Subsequent steps of the process follow those outlined above.

The result of each of these aspects of the present invention is a process for mass replicating plastic articles of practically any shape which have one or more surface relief holograms, diffraction gratings or other microstructures molded directly into either a portion or all of the surface of the plastic articles. It is a growing practice to form injection plastic molds by electrodeposition of a metal on a surface of a model in cases where this is a more efficient procedure than the more typical mechanical machining of mold parts from metal stock. The improvement herein is the provision on the model, prior to an electrodeposition mold forming step, of one or more microstructure surface relief patterns of a type described above.

Additional objects, advantages and features of the present invention will become apparent from the following detailed description of some specific examples of its implementation, which description should be taken in conjunction with the accompanying drawings.

BRIEF DESCRIPTION OF THE DRAWINGS

FIG. 1 illustrates an example of a process for forming a mold and molding articles therefrom in accordance with one specific embodiment of the present invention;

FIG. 2 illustrates a technique for forming a hologram, diffraction pattern or other microstructure by optical interference;

FIG. 3 is a cross-sectional view of an example of a surface relief pattern in a film formed by the technique illustrated in FIG. 2;

FIGS. 4A, 5A and 6A illustrate an example of a process for forming a mold to make plastic bottle caps in accordance with the method of FIG. 1;

FIGS. 4B, 5B and 6B illustrate an example of a process for forming a mold to make plastic ball point pen casings in accordance with the method of FIG. 1;

FIG. 7 illustrates the technique for making a model of a toy car as an initial step in making a mold for mass producing the toy;

FIGS. 8–11 illustrate the steps in making a mold with a microstructure surface relief pattern as an integral part of it, in accordance with a second specific embodiment of the present invention; and FIGS. 12–15 illustrate the steps in making a mold with a microstructure surface relief pattern as an integral part of it, in accordance with a third specific embodiment of the present invention.

DESCRIPTION OF THE PREFERRED EMBODIMENTS

In order to illustrate practical ways to carry out the present invention, three specific embodiments are described below.

Film on Model Embodiment

The method step outline of the technique according to the present invention that is given in FIG. 1 will be described one step at a time, with reference to the remaining figures that illustrate a specific applications of the method steps to making molds for specific articles. A preferred way of carrying out step 10 of FIG. 1, to form a flexible film containing a surface relief hologram, diffraction pattern or other micropattern, is illustrated in FIGS. 2 and 3.

With reference to FIG. 2, a photosensitive film 11 is exposed to two beams 12 and 13 of coherent light that intersect each other at the photosensitive plate 11 with a finite angle between them. The result is that the photosensitive plate 11 records an interference pattern between the two beams over its two-dimensional surface. If neither beam is modulated by an object or other optical information, a simple diffraction grating is formed on the photosensitive plate 11. The use of such a diffraction grating on a molded plastic part may be what is desired in many circumstances, to simply diffract and color spread light reflected from a consumer container to attract attention, for example.

However, it is often more desirable to modulate one of the beams by either passing it through one or more object transparencies or reflecting it off of a three-dimensional object before that beam strikes the photosensitive plate 11 and interferes with the other beam. These possibilities are indicated in FIG. 2 by inclusion of a block 14 in an object beam 12 that includes an object and associated optics. Both of the beams preferably are derived from a single laser light source. In such a case, the interference pattern recorded on the photosensitive plate 11 is then capable of reconstructing an image of an object when it is properly illuminated, and thus becomes a hologram.

FIG. 3 illustrates an example cross-sectional view of the photosensitive plate 11 after exposure and processing. The plate 11 typically includes a rigid glass substrate 15 and a layer of photoresist material 16. The photoresist layer 16 is of uniform thickness until exposed to the interference between the beams 12 and 13. As is well known, exposure of the photoresist material to such an interference pattern causes selective hardening of the material. When the softer material is washed away, a surface relief pattern, indicated at 17, is the result. It is that surface relief pattern that diffracts or refracts incident light in order to reconstruct an image, if a hologram, or diffract light into its various colors if a diffraction pattern formed without any complex object information. The surface relief pattern is a series of very fine grooves having a density, for a typical hologram, of more than 10,000 lines per inch.

It is the goal of the techniques being described to form a mold capable of replicating the surface relief pattern 17 on at least a portion of the plastic parts that are formed by the mold. The next step in a process directed toward that result is to replicate the surface relief pattern 17 in a flexible film that can then be attached to a model of the object to be molded. The formation of such a replica is well known in holography, so will be only briefly mentioned here.

There are two different hologram replication techniques being used. The first is an embossing technique and the second is a casting technique. In either case, a first step is to form a metal master that conforms to the shape of the surface relief pattern 17 to be replicated. This is accomplished by an electrodeposition process where a thin film of metal, generally nickel, is deposited to conform to the surface relief pattern 17. That metal master, or sub-masters made from it, are then used to mass produce copies of the hologram. When an embossing technique is used for replication, a sub-master is urged against a sheet of plastic with sufficient force and temperature to leave an impression of the surface relief pattern in the surface of the film. In the case of casting, a liquid resin is trapped between the sub-master and a supporting film substrate, and allowed to harden by curing. In either case, a hologram replica is formed in extremely thin, flexible plastic material which makes the hologram replica very useful in subsequent steps of the techniques being described. Of course, the same replication techniques can be employed if the surface relief pattern 17 is formed as a simple diffraction pattern without any object information, or as some other microstructure that is optically formed.

Although the optical formation of the surface relief pattern to be used n making the mold is preferred, there are alternative ways of forming such a pattern. For example, diffraction gratings have historically been made by mechanically ruling a hard substrate to form parallel or concentric grooves. Such a diffraction grating can also be used for the techniques herein by then forming a thin film replica of such a diffraction grating. Another example of a microstructure is a retro-reflector cube structure such as is widely used in highly reflective sheet material.

A next step 20 in the process illustrated in FIG. 1 is to make a model of the article to be molded. FIG. 4A shows an example of a model container cap 21, while FIG. 4B shows an example of a model ball point pen piece 22. These models can be made from a wide variety of material, but generally aluminum is the most convenient. Aluminum is soft enough that it can be machined and formed into the desired shape of the part to be molded while at the same time tough enough to be able to withstand subsequent processing steps. Additionally, the electrical conductivity of aluminum assists the electrodeposition process, as mentioned later.

The example model 21 of FIG. 4A is in a cap shape with grooves 23 along a generally cylindrical outside surface to allow the resulting molded cap to be gripped for unthreading from its container base. A generally planar end portion 24 of the model 21 is adapted to have a thin film piece 25 firmly attached to it by an appropriate adhesive. The film 25 contains on its top surface a replica of the surface relief pattern 17 of FIG. 3.

The model 22 of FIG. 4B is a generally tapered, elongated element of circular cross-section. In the example shown in FIG. 4B, a thin, flexible film 26 containing a replica of the surface relief pattern 17 on its outside surface is wrapped around the model 22 and attached to it, in a manner to cover the entire outside surface. Of course, the film 26 can be reduced in size so that it only covers a portion of the surface of the model 22, depending upon the goal for the molded part. The example being described by FIG. 4B is to mold a hollow, generally cylindrical plastic piece used as the main part of a ball point pen.

In order to aid in the attachment of the film to the model, vacuum can be applied through the model. For example, passages (not shown) can be provided in the model 22 which terminate along the surface to which the film is to be attached. When a vacuum is pulled through such passages, the film 26 is drawn tightly against the outside surface of the model 22 with an adhesive therebetween. The film 26 can simultaneously be heated in order to soften it to make it more conformable to the surface's shape. This method is termed a "vacuum thermoforming" technique. It is especially advantageous for attaching the film to a compound model surface.

When such a vacuum thermoforming technique is used, the film is chosen to have properties that complement the process. The film can be chosen from a material that shrinks upon heating, for example, if that helps to conform the film to a model surface to which it is being attached. The film material can be selected to shrink more in one direction than in another, if that assists the attachment process.

As an alternative to forming the hologram or other microstructure on film by casting or embossing, as discussed above, a thinner surface relief pattern can be obtained by a modified casting process. The surface relief pattern is cast by curing liquid resin trapped between a surface relief master and a substrate sheet, as before, but in this case the resin and film properties are chosen so that the cast material does not tightly adhere to the film. The cast layer, containing the surface relief pattern, is attached to the substrate with controlled release properties such that the cured resin film can be removed from the substrate and transferred to the model. A separate release coating can be applied to the substrate before casting onto it, if necessary. The thickness and stiffness of this cast film is reduced, resulting in it being easier to conform the cast layer alone to some model surfaces.

In order to remove the cast layer from the substrate, according to this technique, it is preferred that its exposed surface relief pattern be covered with a low adhesion extensible tape. This tape has sufficient adhesion to allow the cast film and tape to be separated together from the substrate but not so much that the tape cannot be later removed from the cast film. In addition to providing a convenient way of removing the cast layer from the substrate, use of the tape allows the very thin, frangible cast layer to be handled, and protects the surface relief pattern from physical damage, dust and debris while being handled. Further, the tape allows the cast material to be cut into the desired shape, holding it firmly in place while permitting the waste to be removed.

After being cut into the desired shape, the cast film, with tape attached to its side containing the surface relief pattern, has an appropriate adhesive attached to its opposite side. The adhesive can be a pressure sensitive type, an epoxy, a urethane, a cyanoacrylate, a hot melt, or other type that is appropriate for a particular application in order to adhere the cast film to the model surface.

The adhesive coated cast material, supported on its surface relief side by the low adhesion tape, is then attached to the model and the adhesive is cured, if necessary. After the cast film is firmly attached to the model, the tape is then removed, leaving the cast film surface relief pattern exposed.

Once the step 30 indicated in FIG. 1 of attaching the film to the model has been accomplished, a next step 40 of FIG. 1, not illustrated in the remaining figures, can alternatively occur at other times in the process, depending upon various factors. In order to be able to perform the subsequent electrodeposition on the surface of the model and the attached surface relief film, the entire surface must be electrically conductive. If aluminum is used for making the model, as is preferred, the model surface is already electrically conductive except where the plastic surface relief film replica is attached. That surface relief pattern needs to be made electrically conductive, and this is preferably accomplished by deposition of a thin layer of silver in a manner that the silver faithfully follows the surface relief pattern. In such a case where the model is already electrically conductive, it is usually simpler to deposit silver on the film, such as the film 25 of FIG. 4A and 26 of FIG. 4B, before it is attached to their respective models 21 and 22. However, there needs to be electrical continuity between the metal model and the film's conductive layer.

If the model is made from a material that is not electrically conductive, on the other hand, a thin silver layer is deposited over the entire model and film after the film is attached to the model. In such a case, the step 40 is accomplished, of course, after the film is attached to the non-electrically conductive model.

A next step 50 of FIG. 1 is to electrodeposit a thin metal layer, usually nickel, over the model surface including the attached surface relief pattern film. The resulting deposited layers are illustrated in FIGS. 5A and 5B for those examples. In FIG. 5A, a thin nickel layer 51 is deposited over the entire exposed surface of the model 21 and over a silver layer 27 that conforms to the surface relief pattern of the thin film 25. Similarly, in FIG. 5B, a thin layer of nickel 52 is deposited over a silver layer 28 that conforms to the surface relief pattern in the surface of the film 26.

A next step 60 indicated in FIG. 1 is to separate the deposited nickel layer from the rest of the model structure. In FIG. 5A, that means removing the model 21 and the film 25 with its silver layer 27 from the inside of the deposited nickel layer 51. This can possibly be accomplished by heating the structure to a temperature where the aluminum model 21 melts since this is significantly below the temperature at which the nickel layer 51 becomes molten. But it is preferable that most of the model be removed by machining, leaving a layer adjacent the deposited nickel. That model layer and attached film are then removed by etching with a material that attacks aluminum but not nickel, such as a twenty percent solution of hydrochloric acid or hot sodium hydroxide. In a similar manner, in the example of FIG. 5B, an aluminum model 22 and its film 26 with silver coating 28 can be removed from the deposited nickel layer 52. This same technique can be used with models of a wide variety of materials but other techniques may be preferred for models of some materials.

The standard metal structures formed by electrodepositing nickel in the manner being described are usually very thin and fragile. In order to make such a shell as part of a mold, particularly where it will be subjected to significant pressure, a backing plate is machined in the general shape of the metal shell, as indicated by the step 70 of FIG. 1. Such a backing plate 71 is illustrated in FIG. 6A, having been machined to form a cavity in the general shape of the nickel master shell 51. The shell 51 is then attached to that cavity by an appropriate adhesive. Similarly, in the example of FIG. 6B, a backing plate 72 is formed to receive the nickel master shell 52. The result is a part for a mold which, in the examples of FIG. 6A, includes a surface 73 that conforms to the surface of the model 21, while a surface portion 75 conforms to the surface relief pattern 17 of FIG. 3. Similarly, with respect to FIG. 6B, an inner surface 76 conforms to the surface relief pattern.

It is usually preferred to form thin nickel structures by limiting the time of the electrodeposition process, since many surfaces being replicated contain sharp discontinuities. Such discontinuities cause high electrical current densities to exist in the electroformed material at those locations, with a result of nodules being formed by material growing faster in those regions than in others. The thin metal layer is then supported in a manner discussed above. But in cases where the surface being replicated is relatively smooth, or where an irregular thickness of the metal layer is not objectionable, the time of the electrodeposition process can be extended, and/or electrical currents increased, to grow a thicker layer in order to be self-supporting. But even in this case, the metal layer generally will need to be held by a structural piece as part of a mold.

In order to make a cavity for injection molding of plastic parts, step 80 of FIG. 1 indicates that the mold part including the electroformed piece is combined with other machine elements in order to form a complete mold. In the example of FIG. 6A, a rigid, machined metal piece 81 is positioned inside the cavity formed by the nickel shell 51, but not touching that shell, in order to form a cavity 83 therebetween. That cavity has dimensions which correspond to the desired thickness and inside shape of the cap being molded. Similarly, with respect to FIG. 6B, a plug 84 is inserted to result in a cavity 85 that conforms to the shape and thickness of the desired pen walls.

A next step 90 of FIG. 1 is to use the mold so constructed to form plastic parts. This is accomplished according to ordinary techniques. A bore 96 in the plug 81 of FIG. 6A provides a passage for molten plastic to be forced into the cavity 83, openings 91 and 93 providing a vent for air from the cavity. Similarly, in the example of FIG. 6B, a bore 97 is provided for insertion of molten plastic and openings 94 and 95 provide a vent.

It should be noted that the resulting mold needs to be designed with a sufficient draft that allows the molded parts to be removed from the mold, or to make a two piece mold for that purpose. The surface relief pattern is normally only about one micron deep, however, so it is reasonably easy to design the model and form the mold in a way that prevents the molded part locking onto the surface relief pattern of the mold after the plastic has hardened.

A next step 100 of FIG. 1 indicates the desirability in most cases, but not all, to coat each molded plastic piece with a reflective material over the replicated surface relief pattern. Such a coating must be thin enough that it follows the surface relief pattern without altering it in any substantial way. An aluminum coating is generally preferred for this. Such a reflective layer then allows an image that is stored in the surface relief pattern replicated on the molded part, in the case of a hologram, to be brightly reconstructed in light reflected from the surface. However, for many applications, it is not necessary to make the molded surface relief pattern so highly reflective since some light will be reflected from the plastic surface alone.

Referring to FIG. 7, an aluminum model 101 of a toy automobile is given as another example to illustrate the various aspects of the present invention. In this example, a first thin, flexible replica of a surface relief pattern is formed and attached to a windshield portion 103 of the aluminum model. Similarly, a second such film 104 is attached to a position 105 of the model 101 in order to form its rear window. Additional pieces of film could be attached in positions representing other windows of the toy automobile, but only these two will be discussed for simplicity.

This technique allows the films 102 and 104 to be different holograms from which different images can be reconstructed, or to be completely different forms of microstructures. Another significant advantage of the techniques of the present invention is that allows such films to be attached to an irregular, three-dimensional shape of the model with ease. The entire model surface can be covered with different pieces of film, if desired, which can be cut and shaped in a manner to conform to complex model shapes. Additionally, these techniques allow forming a hologram, diffraction pattern or other microstructure over only a portion of a molded part without having to form such a pattern over the entire article.

In the case of the example of FIG. 7, once the film pieces 102 and 104 are firmly attached to the model 101, the process of forming a mold proceeds as discussed with respect to the outline of FIG. 1, beginning with the step 40. As is commonly done in injection molding, large or complex surface shapes may involve making several pieces that fit together to form the mold. For the car model of FIG. 7, this can involve a separate mold piece for the hood, another for the windshield, yet another for the top, and so on. Each piece can then easily be made with a different surface structure since each piece has to be constructed individually anyway.

Film on Mold Embodiment

In the examples given above, the model is first formed of the molded part and then the female mold is made from its surface. An alternative technique that may be applicable to certain types of articles, is to first form a female of the article to be molded, without any surface relief pattern. A piece of film is then attached on a portion of its inside surface so that the surface relief pattern faces outward of that surface. A male member corresponding to the shape of the article to be molded is then formed by electroforming. The process then proceeds as outlined in FIG. 1, beginning with step 50 except no film is attached to the article since the surface relief pattern already exists on it.

These modified steps are illustrated by FIGS. 8-11. A solid piece 111 has, as an example, a concave surface 113 to which a thin piece of film 115 is attached. The film 115 is of the type discussed above that contains a hologram or other microsurface relief pattern to be formed on the surface of molded items. The surface 113 is a mirror image of at least a portion of the surface of the item to be molded. The piece 111 can be a mold of the object surface that is made by conventional machining techniques or by electrodeposition, without any surface relief pattern being included. That surface relief pattern is added after the mold piece is made, according to the technique of FIGS. 8-11.

A replica of the surface 113 with the surface relief pattern film 115 is then made by an electrodeposition process. The result of that is a thin metal film 117 (FIG. 10) which is a mirror image of the surface 113 of the mold piece 111. Piece 117 is convex in shape and contains the surface relief pattern of the film 115 impressed therein as a unitary part of the entire surface structure.

The next step is to form a replica of the structure 117 by an electrodeposition process, resulting in a thin metal replica 119 (FIG. 11). This replica is attached to a backing plate 121 and serves as a piece of an injection mold. It will be noted that the surface of the replica 119 is again a concave shape, as was the original surface 113 (FIG. 8) of the item mold. However, the surface of the replica 119 contains the surface relief pattern of the film 115 as an integral part of its structure rather than as a film attachment. The process illustrated in FIGS. 8-11 starts out with a female mold piece (FIGS. 8 and 9), makes a male replica by electrodeposition from it (FIG. 10) and then makes a second generation replica (FIG. 1) which again is a female part and ready to be used to mold an article.

Embodiment of Optically Forming a Microstructure Directly on the Model or the Mold Rather than forming the hologram or other microstructure in a film and then attaching that film to a model or mold piece, an alternate technique illustrated by FIGS. 12-15 forms the microstructure directly on either a model of the item to be molded or a normal mold thereof. Referring initially to FIG. 12, a female mold piece 123 has a photosensitive material layer 125 coated on its concave surface that defines a surface of an item to be molded. The material layer of layer 125 is preferably a photoresist material. Two interfering coherent light beams 12' and 13', corresponding respectively to beams 12 and 13 of FIG. 2, intersect at the film 125 and form an interference pattern that is recorded in the film. Once it is processed (developed) to turn the intensity variations of the interference pattern into grooves in a surface relief pattern, a replica 127 (FIG. 13) is made in order to faithfully reproduce the microsurface relief pattern and any other portions of the mold 123 not covered by the film 125.

The structure 127 is thereafter used to form another replica metal film 129 therefrom (FIG. 15) in a further electrodeposition step. This fragile metal replica is attached to an appropriate backing plate 131 in order to form an injection mold cavity wall.

Alternately to coating a mold of the object, an object 133 (FIG. 14) may have at least a portion of a surface 135 coated with a photoresist layer 137. The layer 137 is then exposed to interfering coherent light beams 12'' and 13'', corresponding respectively to light beams 12 and 13 of FIG. 2. Once the exposed photosensitive layer 137 is processed to form a surface relief pattern, that surface relief pattern is replicated by a single electrodeposition process to form the metal layer 129 (FIG. 15).

Although the various aspects of the present inventions have been described with respect to specific examples thereof, it will be understood that the invention is entitled to protection within the full scope of the appended claims.

It is claimed:

1. A method of mass producing an item, comprising the steps of:

making a model of the outside surface of said item including a relief pattern over at least a portion of its surface that corresponds to an interference pattern formed from two intersecting beams of coherent optical radiation, forming a layer of hard material over the model outside surface, including the surface relief pattern, in a manner that said hard material layer conforms to the shape of the surface and said pattern, separating the model and surface relief pattern from the hard material layer, whereby a replica of the model surface and said relief pattern is made, forming from said replica at least one wall portion of a cavity of a mold in a manner that the replicated surface relief pattern forms an integral portion of at least a portion of said wall, and repetitively forming a copy of said item by flowing molten material into said cavity, allowing the material to harden, and subsequently removing the hardened item from said cavity, whereby said item is mass produced with the surface relief pattern replicated over at least a portion of its surface.

2. A method of mass producing a three-dimensional item having at least a portion of its outside surface in a non-planar shape, comprising the steps of:

making a model of the outside surface of said item that includes a micro surface relief pattern on at least a portion of its said non-planar outside surface portion, forming a layer of hard material over the model outside surface, including the surface relief pattern, in a manner that said hard material layer conforms to the shape of the surface and said pattern, separating the model and surface relief pattern from the hard material layer, whereby a replica of the model surface and said relief pattern is made, forming from said replica at least one wall portion of a cavity of a mold in a manner that the replicated surface relief pattern forms an integral portion of at least a portion of said wall, and repetitively forming a copy of said item by flowing molten material into said cavity, allowing the material to harden, and then removing the hardened item from the cavity, whereby said item is mass produced in with the surface relief pattern replicated over at last a portion of its surface.

3. A method according to either of claims 1 or 2 wherein the model making step includes the steps of:
   forming the model without said surface relief pattern,
   forming the surface relief pattern on a piece of flexible film, and
   attaching the film to said at last a portion of said model's surface.

4. A method according to either of claims 1 or 2 wherein the model making step includes the steps of:
   forming a mirror image of the model surface without the surface relief pattern,
   forming the surface relief pattern on a piece of flexible film,
   attaching the film to said mirror image, and
   forming a layer of hard material over the model mirror image surface, including the surface relief pattern, in a manner that said hard material layer conforms to the shape of the surface and said pattern, whereby said model is made.

5. A method according to either of claims 1 or 2 wherein the step of forming a layer of hard material over the model outside surface includes doing so by an electroforming process in a manner to form said hard material to be thin enough that the layer does not support itself, and wherein the step of forming said mold cavity at least one wall portion includes attaching said layer to a backing plate that has a surface formed generally into the shape of said layer.

6. A method according to claim 1 wherein the step of making the model includes the following steps of making the surface relief pattern:
   making a mirror image of said model surface without said surface relief pattern,
   coating at least a portion of the model surface mirror image with a light sensitive material,
   exposing said light sensitive material to interfering beams of coherent light,
   processing the exposed light sensitive material to develop said surface relief pattern, and
   forming a layer of hard material over the model mirror surface, including the surface relief pattern, in a manner that said hard material layer conforms to the shape of the surface and said pattern, whereby said model is made.

7. The method according to either of claims 1 or 2 which comprises the additional step of applying a layer of reflective material to at least the surface relief pattern of the hardened item.

8. The method according to either of claims 1 or 2 wherein the step of making a model includes the step of making the surface relief pattern by recording an off-axis hologram of an image, whereby said image is reconstructed in light reflected from the replicated surface relief pattern of the plastic items.

9. The method according to any one of claims 1, 2, or 6 wherein each of the steps of forming a layer or hard material includes forming a metal layer by an electrodeposition process.

10. The method according to claim 1 wherein the step of making a model includes making at least a portion of the model outside surface non-planar in a region of said surface relief pattern.

11. The method according to either of claims 1 or 2 wherein the step making a model includes limiting the area of the surface relief pattern to only a potion of said model outside surface, wherein the replicated surface relief pattern extends over only a portion of aid mold cavity at least one wall portion, thereby causing the surface relief pattern to extend over only a portion of the surface of the replicas that are formed by said hard material layer.

12. The method according to claim 1 wherein the model making step includes the steps of:
   forming the model without said surface relief pattern,
   coating said at least a portion of the model surface with a layer of photosensitive material,
   exposing said photosensitive material layer to said two interfering beams of coherent optical radiation, and
   processing the exposed photosensitive material layer to develop said surface relief pattern.

13. The method according to claim 2 wherein the model making step includes the steps of:
   forming the model without said surface relief pattern,
   coating said at least a portion of the model surface with a layer of photosensitive material,
   exposing said photosensitive material layer to at least two interfering beams of coherent optical radiation, and
   processing the exposed photosensitive material layer to develop said surface relief pattern.

14. The method according to either of claims 12 or 13 wherein the photosensitive material layer exposing step includes directing one of said interfering beams against an object prior to its striking said photosensitive material, whereby said surface relief pattern includes a hologram from which an image of said object may be viewed.

15. A method of making at least a piece of a wall of a cavity for plastic molding of articles in the shape of said cavity, comprising the steps of:
   making a model of the outside surface of aid item including a relief pattern over at least a portion of its surface that corresponds to an interference pattern formed from two intersecting beams of coherent optical radiation,
   forming a layer of hard material over the model outside surface, including the surface relief pattern, in a manner that said hard material layer conforms to the shape of the surface and said pattern, and
   separating the model from the hard material layer, whereby said hard material layer is useable to form an element of a molding cavity wherein the replicated surface relief pattern is integrally formed as part of at least a portion of a wall of said cavity.

16. A method of making a wall of a cavity for plastic molding of articles in the shape of said cavity wherein said article is three-dimensional and includes at least a portion of its outside surface in a non-planar shape, comprising the steps of:

making a model of the outside surface of said item that includes a micro surface relief pattern on at least a portion of its said non-planar outside surface portion, electrodepositing a layer of hard material over at least a portion of the model outside surface including the surface relief pattern, whereby said hard material conforms to the shape of the surface and said pattern, and separating the model from the hard material layer, whereby said hard material layer is useable to form an element of a plastic molding cavity wherein the replicated surface relief pattern is integrally formed as part of at least a portion of a wall of said cavity.

17. The method according to either claim 15 or 16 wherein the step of making a cavity wall includes making the surface relief pattern by recording an off-axis hologram of an image, whereby the replicated surface relief pattern on the wall of the cavity contains a hologram of said image.

18. The method according to claim 15 wherein the step of forming a layer of hard material includes forming a metal layer by an electrodeposition process.

19. The method according to claim 15 wherein the step of making a model includes making at least a portion of the model outside surface non-planar in the region of the surface relief pattern.

20. The method according to claim 15 wherein the step of making the model includes forming the surface relief pattern only over a portion of said model outside surface, whereby the replicated surface relief pattern forms only a portion of the cavity wall.

21. The method according to either of claims 15 or 16 wherein the model making step includes first forming an initial replica of the outside surface of said item including the relief pattern thereover, whereby said initial replica serves as the model from which said hard material layer is formed.

22. A method of mass producing an item, comprising the steps of:

forming on a flexible film a surface relief pattern corresponding to an interference pattern resulting from an interference of two beams of coherent optical radiation, making a model of the outside surface of said item, attaching said film to at least a portion of the outside surface of said model in a manner that the surface relief pattern faces outward of said model, forming a layer of hard material over the model outside surface, including the surface relief pattern, in a manner that said hard material layer conforms to the shape of the surface and said pattern, separating the model and film from the hard material layer, forming from said replica at least one wall of a cavity of a mold in a manner that the replicated surface relief pattern forms an integral portion of at least a portion of said wall, and repetitively forming a copy of said item by flowing molten plastic into said cavity, allowing the plastic to harden, and subsequently removing the hardened item from said cavity, whereby said item is mass produced in plastic with the surface relief pattern replicated over at least a portion of its surface.

23. A method of mass producing a three-dimensional item having at least a portion of its outside surface in a non-planar shape, comprising the steps of:

forming a micro-surface relief pattern on a flexible substrate, making a model of the outside surface of said item, attaching said flexible substrate to at least a portion of the non-planar outside surface portion of said model in a manner that the surface relief pattern faces outward of said model, forming a layer of hard material over the model outside surface, including the surface relief pattern, in a manner that said hard material layer conforms to the shape of the surface and said pattern, separating the model and substrate from the hard material layer, forming from said replica at least one wall of a cavity of a mold in a manner that the replicated surface relief pattern forms at least a portion of said wall, and repetitively forming a copy of said item by flowing molten plastic into said cavity, allowing the plastic to harden, and subsequently removing the hardened item from said cavity, whereby said item is mass produced in plastic with the surface relief pattern replicated over at least a portion of its surface.

24. The method according to either of claims 22 or 23 which comprises the additional step of applying a layer of reflective material to at least the surface relief pattern of the hardened item.

25. The method according to either of claims 22 or 23 wherein the step of forming a surface relief pattern includes the step of recording an off-axis hologram of an image, whereby said image is reconstructed in light reflected from the replicated surface relief pattern of the replicated plastic item.

26. The method according to either of claims 22 or 23 wherein the step of forming a layer of hard material includes forming a metal layer by an electrodeposition process.

27. The method according to claim 22 wherein the step of making a model includes making at least a portion of the model outside surface non-planar, and wherein the step of attaching said film includes attaching said film to said non-planar surface portion.

28. The method according to claim 22 wherein the step of attaching said film includes attaching said film to only a portion of said model outside surface, thereby causing the surface relief pattern to extend over only a portion of the surface of the replicated item molded by said hard material layer.

29. A method of making at least piece of a wall of a cavity for injection plastic molding of articles in the shape of said cavity, comprising the steps of:

forming on a flexible film a surface relief pattern corresponding to an interference pattern resulting from an interference of two beams of coherent optical radiation, making a model of the outside surface of said article, attaching said film to at least a portion of the outside surface of said model in a manner that the surface relief pattern faces outward of said model, forming a layer of hard material over the model outside surface, including the surface relief pattern, in a manner that said hard material layer conforms to the shape of the surface and said pattern, and separating the model and film from the hard material layer, whereby said hard material layer is useable to form an element of an injection molding cavity wherein the replicated surface relief pattern is an integral part of said at least a portion of a wall of said cavity.

30. A method of making a wall of a cavity for injection plastic molding of articles in the shape of said cavity wherein said article is three-dimensional and includes at least a portion of its outside surface in a non-planar shape, comprising the steps of:
forming on a flexible substrate a micro-surface relief pattern,
making a model of the outside surface of said article,
attaching said film to at least a portion of the nonplanar outside surface portion of said model in a manner that the surface relief pattern faces outward of said model,
electrodepositing a layer of hard material over at least a portion of the model outside surface including the surface relief pattern, whereby said hard material conforms to the shape of the surface and said pattern, and
separating the model and substrate from the hard material layer, whereby said hard material layer is useable to form an element of a plastic molding cavity wherein the replicated surface relief pattern is an integral part of said at least a portion of a wall of said cavity.

31. The method according to either claim 29 or 30 wherein the step of forming a surface relief pattern includes the step of recording an off-axis hologram of an image, whereby the replicated surface relief pattern on the wall of the cavity contains a hologram of said image.

32. The method according to claim 29 wherein the step of forming a layer of hard material includes forming a metal layer by an electrodeposition process.

33. The method according to claim 29 wherein the step of making a model includes making at least a portion of the model outside surface non-planar, and wherein the step of attaching said film includes attaching said film to said non-planar surface portion.

34. The method according to claim 29 wherein the step of attaching said film includes attaching said film to only a portion of said model outside surface.

35. A method of making a wall of a cavity for injection plastic molding of three-dimensional articles in the shape of said cavity, comprising the steps of:
making a model corresponding to a shape of at least a portion of a non-planar outside surface of said article,
coating said at least a portion of the model outside surface with a photosensitive material layer,
exposing said photosensitive material layer to at least two interfering beams of coherent light,
processing the exposed photosensitive material layer to develop a surface relief pattern corresponding to a pattern of light interference between said at least two coherent light beams,
electrodepositing a layer of metal over at least a portion of the model outside surface including the surface relief pattern, whereby said metal conforms to the shape of the model surface and said pattern,
separating the model and substrate from the metal layer, and
utilizing said metal layer to form an element of a plastic molding cavity in a manner that the replicated surface relief pattern is an integral part of said at least a portion of a wall of said cavity.

36. The method according to claim 35 wherein the photosensitive material exposing step includes directing one of said at least two interfering beams against an object prior to its striking said photosensitive material, whereby said surface relief pattern is a hologram from which an image of said object may be viewed.

37. The method according to either of claims 35 or 36 wherein the model making step includes a step of making the model with a surface portion that is a negative in shape of said at least a portion of a non-planar outside surface of said article.

38. The method according to either of claims 35 or 36 wherein the model making step includes a step of making the model with a surface portion that is a positive in shape of said at least a portion of a non-planar outside surface of said article.

* * * * *

UNITED STATES PATENT AND TRADEMARK OFFICE
CERTIFICATE OF CORRECTION

PATENT NO. : 5,071,597
DATED : December 10, 1991
INVENTOR(S) : Salvatore F. D'Amato, Donald W. Mallik It is certified that error appears in the above-identified patent and that said Letters Patent is hereby corrected as shown below:

Column 11, line 15, in Claim 2:    replace "last"
                                    with --least--

Column 11, line 21, in Claim 3:    replace "last"
                                    with --least--

Column 12, line 4, in Claim 9:     replace "or"
                                    with --of--

Column 12, line 12, in Claim 11:   insert --of--
                                    after "step"

Column 12, line 13, in Claim 11:   replace "potion"
                                    with --portion--

Column 12, line 15, in Claim 11:   replace "aid"
                                    with --said--

Column 12, line 50, in Claim 15:   replace "aid"
                                    with --said--

UNITED STATES PATENT AND TRADEMARK OFFICE
CERTIFICATE OF CORRECTION

PATENT NO. : 5,071,597

DATED : December 10, 1991

INVENTOR(S) : Salvatore F. D'Amato, et al.

It is certified that error appears in the above-identified patent and that said Letters Patent is hereby corrected as shown below:

Column 14, line 50, claim 29, insert --a--, after "least".

Signed and Sealed this

Twenty-third Day of March, 1993

*Attest:*

STEPHEN G. KUNIN

*Attesting Officer*     *Acting Commissioner of Patents and Trademarks*